United States Patent [19]

Takahashi et al.

[11] Patent Number: 5,324,758
[45] Date of Patent: Jun. 28, 1994

[54] VIBRATION DAMPING MATERIAL OF ASPHALT CEMENT

[75] Inventors: Masaaki Takahashi; Yasuo Soga; Kazuyoshi Iatagaki; Yutaka Fujita; Yutaka Nakamura, all of Tokyo, Japan

[73] Assignees: Sohwa Shell Sekiyu Kabushiki Kaisha; Shimizu Construction Co., Ltd., both of Tokyo, Japan

[21] Appl. No.: 983,292

[22] Filed: Nov. 30, 1992

Related U.S. Application Data

[63] Continuation of Ser. No. 814,036, Dec. 24, 1991, abandoned, which is a continuation of Ser. No. 680,796, Apr. 3, 1991, abandoned, which is a continuation of Ser. No. 390,888, Aug. 8, 1989, abandoned.

[30] Foreign Application Priority Data

Aug. 11, 1988 [JP] Japan ................... 63-200759

[51] Int. Cl.$^5$ .................. C08K 5/01
[52] U.S. Cl. .................. 524/59; 524/62; 524/64; 524/519; 524/515; 524/526; 524/571; 524/573; 524/574; 524/575; 524/575.5
[58] Field of Search ................ 524/59, 62, 64

[56] References Cited

U.S. PATENT DOCUMENTS

| | | | |
|---|---|---|---|
| 3,891,585 | 6/1975 | McDonald | 524/59 |
| 4,069,181 | 1/1978 | Healy et al. | 524/70 |
| 4,430,464 | 1/1984 | Oliver | 524/59 |
| 4,430,465 | 2/1984 | Abbott | 524/62 |

FOREIGN PATENT DOCUMENTS

| | | |
|---|---|---|
| 818611 | 7/1969 | Canada . |
| 62-153347 | 7/1987 | Japan . |
| 1130140 | 10/1968 | United Kingdom . |
| 1177725 | 1/1970 | United Kingdom . |
| 1190486 | 5/1970 | United Kingdom . |
| 1324599 | 7/1973 | United Kingdom . |
| 1324600 | 7/1973 | United Kingdom . |
| 2010289 | 12/1978 | United Kingdom . |
| 1548541 | 7/1979 | United Kingdom . |
| WO8606736 | 11/1986 | World Int. Prop. O. . |

OTHER PUBLICATIONS

"Vibration Damping Materials", Shin Nihon Seitetsu, Kabushiki Kaisha, Sales Promotional Leaflet, pp. 3-4, Translated version.

Translation of "Vibration Damping Materials" p. 3, Shin Nihon Seitetsu, Technical Bulletin, pp. 17-18, Sasaki.

*Primary Examiner*—Bernard Lipman
*Attorney, Agent, or Firm*—Oliff & Berridge

[57] ABSTRACT

A vibration damping material of asphalt cement comprising a) 60-90 parts by weight of asphalt cement: b) 10-30 parts by weight of thermoplastic rubber: and c) 0-20 parts by weight of tacky producer. A total sum of weight of a), b) and c) is 100 parts by weight. A penetration of the vibration damping material falls in a range of 35 to 140.

11 Claims, 3 Drawing Sheets

VIBRATION DAMPING MATERIAL OF ASPHALT CEMENT

This is a continuation of application Ser. No. 07/814,036 filed Dec. 24, 1991, now abandoned, which in turn is a continuation of application Ser. No. 07/680,796, filed Apr. 3, 1991, now abandoned, which in turn is a continuation of application Ser. No. 07/390,888, filed Aug. 8, 1989, now abandoned.

BACKGROUND OF THE INVENTION

1. Field of the Invention

This invention relates to a vibration damping material of asphalt cement and, more particularly, to a vibration damping material used in structural members, such as posts, beams, floors or a ceiling surface of a civil construction or a building to damp a vibration and a mechanical vibration or the like due to an earthquake, wind and/or a traffic.

2. PRIOR ART

Heretofore, various types of elastic and viscoelastic materials have been employed for damping of vibrations of a civil construction or a building.

Elastic materials, such as plates-shaped or block-shaped hard rubber, hard synthetic rubber, etc. have been used. These materials lack vibration damping performance due to excessively strong rubber elasticity. Since the rubber itself does not have adhesion properties, it is necessary to coat an adhesive over the rubber, or to adhere a plate or the like having adhesion function to a surface of the rubber to compose a construction material of two or more layers.

Silicone resin or polymer materials are considered as the viscoelastic substance. Since the silicone resin is expensive and slightly deteriorates in its damping performance, it is improper to be employed as the vibration damping material of a building. Polymer materials have some problems regarding its vibration damping performance, cost and workability (which needs to be sealed due to liquid).

Asphalt cement is widely employed as a vibration damping material due to its excellent stickiness, deformability and water tightness.

However, the asphalt cement itself has disadvantages, such as low adhesive properties at ambient temperatures, brittleness, easy cracks at low temperature, and large flowability, low elasticity and hard restoration after tension or compression thereof at high temperature.

There are jointing materials for a civil construction and a building in which rubber and filler are mixed with asphalt cement. Since the jointing materials have large rubber elasticity and less energy consumption amounts, they are improper as for vibration damping material.

There are also paving materials in which rubber is mixed with asphalt cement. The paving materials have disadvantages, such as excessively small rubber elasticity to have its bad vibration damping performance and a low softening point to flow when using in a vertical surface.

The largest reasons why the vibration damping material for satisfying the above-mentioned various properties cannot be obtained are (1) material itself does not have strong adhesion properties: (2) material does not have stable and high damping performance in a wide temperature range: and (3) material does not have high viscous shearing resistance (high deformability and preferable restoration) in its shearing deformation.

Thus, recently there have been employed (1) a heat fusion type sheet made of an asphalt cement, thermoplastic resin and inorganic filler, which is heat-fused and adhered to a surface to be coated at the time of working the sheet, and (2) a sheet or a panel having a structure of two or more layers in which viscoelastic asphalt cement filled with rubber are adhered to a thin plate made of aluminum or the like.

Therefore, it has been desired to develop a material which has strong adhesion properties, suitable viscoelastic property, tensile strength, flowability resistance at high temperatures, stickiness and moldability at low temperatures, stable and high damping performance and high viscous shearing resistance (high deformability and preferable restoration) in a wide temperature range.

SUMMARY OF THE INVENTION

Accordingly, it is a main object of this invention to provide a vibration damping material of asphalt cement which has high damping property, suitable restoration and suitable deformability to be formed in a desired shape with only the material itself by mixing asphalt cement, rubber and/or adhesive.

According to this invention, there is provided a vibration damping material of asphalt cement comprising a) 60–90 parts by weight of asphalt cement: b) 10–30 parts by weight of thermoplastic rubber: and c) 0–20 parts by weight of tacky producer: wherein a total sum of weight of a), b) and c) is 100 parts by weight and a penetration of the material falls in a range of 35 to 140.

In this specification, the vibration damping material of this invention is defined to have a function of absorbing energy by means of a distortion produced when a repetitive shearing deformation acts in a direction perpendicular to a thicknesswise direction of a sheet-like viscoelastic material.

Compositions of the material of this invention will be described in detail.

(1) Asphalt Cement

"Asphalt cement" is also called as "petroleum asphalt" or "bitumen" and is generic designation of coal tar, petroleum tar pitch, natural asphalt, petroleum asphalt, etc., and their mixtures. The asphalt cement mainly comprises hydrocarbon, and is brown or black brown material being liquid, semisolid or solid at ambient temperatures. A representative example of the asphalt cement is straight asphalt of petroleum asphalt, which has 0–300 of penetration (under measuring conditions of 1/10 mm: 100 g, 25° C. and 5 sec.) (Japanese Industrial Standards, (hereinafter referred to as "JIS") K2207).

In this invention, straight asphalts having 290 and 150 of penetrations is employed to obtain vibration damping material. As a result, the present inventors have found that material having 35–140 of penetration was available as vibration damping material.

Preferably, the asphalt cement employed in this invention has 35 to 300 of penetration. Physical properties except the penetration of the asphalt cement are not particularly limited in the vibration damping material of this invention. Accordingly, any asphalt cement as defined above can be selected and employed by adjusting the penetration thereof. The asphalt cement having small penetration and high hardness can be employed by diluting the same with mineral oil, kerosene, gas oil, extra oil or vegetable oil, etc. to adjust its penetration to a range of 35 to 300. When the asphalt cement having less than 35 of the penetration is employed, it has high viscosity so that the asphalt cement and the thermoplastic rubber can not be mixed. The vibration damping material produced from the asphalt cement having more than 300 of the penetration does not have preferable vibration damping performance so that it is hardly to employed as a practical use.

The asphalt cement contained in the vibration damping material of this invention is ranged in (1) 70–90 parts by weight, in case without containing tacky producer, and (2) 60–80 parts by weight, in case of containing tacky producer. If the content of the asphalt cement is less than the lower limit value, it is necessary to increase contents of rubber and/or tacky producer. If the contents of rubber is high, its viscosity is raised so that it becomes difficult to mix an asphalt cement with a rubber and the vibration damping material becomes expensive. If the tacky producer is excessively contained, the damping effect of the vibration damping material is not improved, and the vibration damping material becomes expensive. If the content of the asphalt cements exceeds the upper limit value, the quantity of rubber and/or tacky producer is low, and preferable rubber elasticity can not be obtained. Further, a problem, such as improper adhesive properties at low temperatures arises thereby to cause the vibration damping performance to be remarkably deteriorated so that such vibration damping material is hardly employed as a practical use.

(2) Thermoplastic Rubber

Natural rubber and synthetic resins such as styrene-butadiene rubber (SBR), butyl rubber, neoprene rubber, chloroprene rubber, etc. and the mixture thereof may be available. Two or more rubber can be mixed in any mixing rate. Reclaimed rubber may be also available and is preferable in view of its cost. More preferable rubbers include styrene butadiene-styrene block copolymer (SBS), styrene isoprene-styrene block copolymer (SIS). Cariflex TR1101, trade name of Shell Kagaku Kabushiki Kaisha of SBS, and Cariflex TR1107, trade name of Shell Kagaku Kabushiki Kaisha of SIS may be available.

The rubber contained in the vibration damping material of this invention is ranged from 10 to 30 parts by weight. If the content of the rubber is less than 10 parts by weight, its temperature dependency is wrong, its viscous shearing resistance force becomes small, its tensile stress in a high temperature range decreases (becomes small during elongation and compression), and its vibration damping performance is reduced. If the content of the rubber exceeds 30 parts by weight, its viscosity is remarkably increased. Thus, its operability, such as the transfer of the vibration damping material after the material is mixed in a mixer and produced, or the production of a sheet becomes difficult.

The smaller the penetration of the asphalt cement is, the higher the viscosity rises. Therefore, when relatively large quantity of rubber (more than 10 parts by weight of rubber) is mixed, it is impossible to remarkably reduce the penetration of the vibration damping material of this invention due to the above-mentioned mixture and operability. It is generally difficult to produce the vibration damping material which has 35 or less of penetration and not hence practical.

(3) Tacky Producer

According to this invention, the vibration damping material having an adhesive effect can be obtained due to an adhesive performance of the asphalt itself at ambient temperatures or higher even if a tacky producer is not contained in the vibration damping material. However, when the vibration damping material of this invention is employed, for example, at about 5° C. of atmospheric temperature in winter, it is necessary to heat the surface of the vibration damping material of this invention and to then use the material. By containing the tacky producer in the vibration damping material of this invention, the vibration damping material is available without heating. The addition of the tacky producer does not affect the vibration damping performance of the vibration damping material.

The tacky producer includes, for example, polybutene, polybutenyl succinic anhydride being liquid at ambient temperature, and terpinic resin, modified wood rosin, etc. being solid at ambient temperatures. Nisseki Polybutene HV 300 (Trade name of Nippon Sekiyu Kagaku K.K.) of polybutene, HITEC 051 (Trade name of Nippon Cooper K.K.) of polybutenyl succinic anhydride, YS Resin PF (Trade name of Yasuhara Oil Industry Co., Ltd.) of Terpinic resin, Gumrosin (Trade name of Yasuhara Oil Industry Co., Ltd.) of modified Wood Rosin may be available.

The content of the tacky producer is ranged from 0 to 20 parts by weight. If its content exceeds 20 parts by weight, its mutual solubility with the asphalt cement is deteriorated, and the vibration damping material becomes expensive and has a large temperature dependency. Thus, such vibration damping material including more than 20 parts by weight of the tacky producer is hardly employed as a practical use.

The mixing ratios of the above-described asphalt cement and the thermoplastic rubber (and the tacky producer in case of including the producer) are defined with respect to 100 parts by weight of the total sum of them.

According to this invention, when the penetration and the contents are ranged as described above, the vibration damping material which has stable vibration damping performance in a wide temperature range, excellent adhesion properties, workability and execution of use by freely combining the asphalt cement and the thermoplastic rubber (and the tacky producer), can be obtained.

A process for producing the vibration damping material of this invention will be exemplified. Rubber (and tacky producer) is mixed with asphalt cement having 35 to 300 of penetration. The mixture is heated and melted at approx. 180° C. so as not to cause the polycondensation of the rubber and uniformly mixed by a high shearing mixer, such as mixing rolls, Bambury mixer, etc.

The solution of the mixture thus obtained is molded in a desired shape (block or sheet shape). For example, when a block shaped vibration damping material is molded, a block-shaped framework is prepared in advance, the mixture solution is poured into the framework, and then solidified by natural cooling. When a sheet shaped vibration damping material is molded, the solution of the mixture is fed on a mold release paper treated with silicone oil and then formed in a desired thickness by a doctor knife. A mold release paper is superposed thereon to form the vibration damping material in a sheet shape. The mixture solution may be temporarily molded in a block shape, and then molded in a sheet shape by a hot press mold. The mixture solution may be molded in a sheet shape or a desired shape by heating and melting the asphalt cement and the rubber (and the tacky producer) by a burner or the like when using the vibration damping material.

DESCRIPTION OF THE PREFERRED EMBODIMENTS

Figure 1:
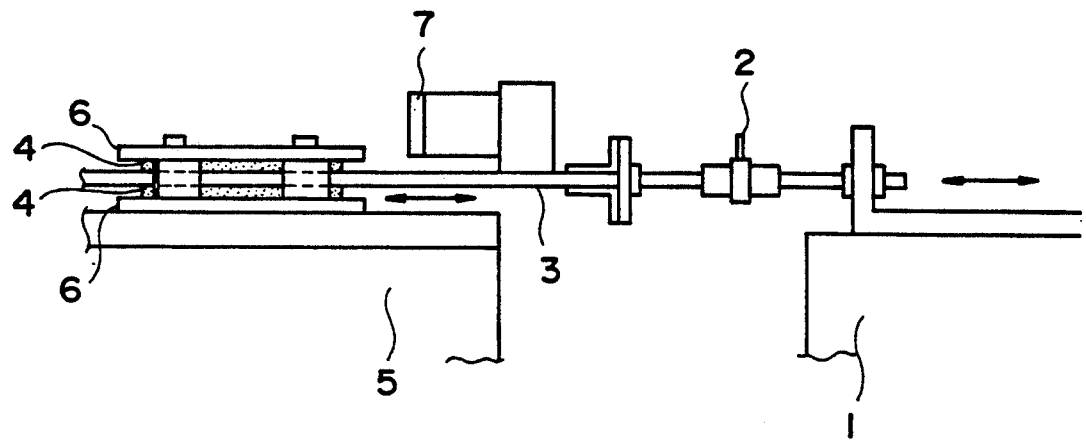
FIG. 1 is a side view of an example of a vibration damping apparatus.

Embodiments of this invention will be indicated in Table 1. However, the present invention is not limited to the particular embodiments described below.

JIS to be invaded perpendicularly to a sample under conditions defined in JIS.

Unit value of the penetration corresponds to 0.1 mm.

(2) Softening Point (JIS K-2207)

A softening point represents a temperature when an asphalt cement softens, and is a temperature when a sample heated under a condition defined in JIS is drooped at a distance defined in JIS.

(3) Peeling Strength (JIS Z-0237)

A sample is molded as a sheet with a thickness of 0.2 mm by a hot press. One side face of the molded sheet is adhered to a nonwoven fabric. A mold release paper is adhered to the other side face of the molded sheet. The molded sheet with nonwoven fabric and the mold release paper is cut 2.5 cm wide and 12 cm long to prepare a test piece. Then, the mold release paper is teared off and an adhesive face of the test piece is adhered to a clean stainless steel plate in air bath held at a temperature defined in JIS. The test piece is exfoliated at a speed of 5 cm/min, and the peeling strength at 180° C. is measured.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Composition | | | | | | | | |
| Asphalt | | | | | | | | |
| Penetration 150 | 76 | 68 | 86 | — | — | 87 | 73 | — |
| Penetration 290 | — | — | — | 75 | 76 | — | — | 58 |
| Thermoplastic rubber | 14 | 22 | 14 | 20 | 14 | 8 | 22 | 32 |
| Tacky producer | 10 | 10 | — | 5 | 10 | 5 | 5 | 10 |
| Physical properties | | | | | | | | |
| Penetration (25° C.) | 105 | 40 | 90 | 110 | 150 | 98 | 34 | high viscosity disable mix |
| Softening point (°C.) | 87.0 | 110.0 | 92.0 | 84.0 | 82.0 | 75.0 | | |
| Peeling strength (kgf/2.5 mm) (5 C, tension, 5 cm/min, stainless steel plate) | 1.5 | 0.5 | 0.0 | 2.5 | 3.5 | 0.5 | high viscosity considerably difficult to mix | |
| Damping force (kg) (f = 0.33 Hz, t = 20 C, δ = 5 mm) | 56.2 | 85.1 | 55.1 | 52.6 | 33.1 | 180.3 | | |

δ: Amplitude

The vibration damping materials of Examples 1 to 4 and Comparative Examples 1 to 4 in Table 1 were produced by the above-mentioned process for producing the vibration damping material with asphalt cement, thermoplastic rubber and tacky produced.

In the Examples 2 and 4 and Comparative Examples 1 to 4, SBS (Cariflex TR1101) was used as thermoplastic rubber. In the Examples 1 and 3, 7 parts by weight of SBS (Cariflex TR1101) and 7 parts by weight of SIS (Cariflex TR1107) were used as thermoplastic rubber. In the Examples 1, 2 and 4 and Comparative Examples 1 to 4, polybutene (Nisseki Polybutene HV-300) was used as tacky producer.

Methods of Evaluating the Vibration Damping Material

Methods of evaluating the above-described vibration damping material are as below.

(1) Penetration (JIS K-2207)

A penetration represents a hardness of an asphalt cement, as indicated by a length of a stylus defined in

(4) Damping Force

Figure 2:
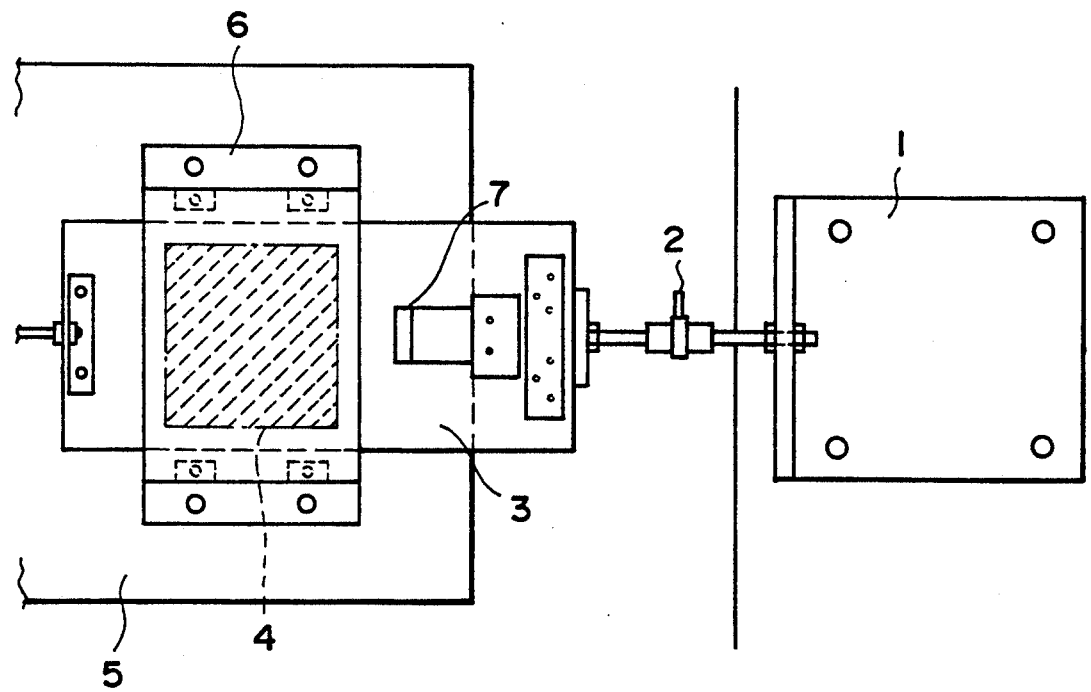
FIG. 2 is a plane view of the vibration damping apparatus.

A damping force of a vibration damping material is measured by a vibration damping apparatus shown in FIGS. 1 and 2. As shown in FIG. 1, a vibration plate 3 is attached through a load cell 2 to a vibration base 1 which is vibrated in a direction of an arrow. Vibration damping materials 4, 4 having 85 mm × 85 mm × 5 mm are adhered to upper and lower surfaces of the vibration plate 3. The other faces of the vibration damping materials 4, 4 are respectively fixed to a stationary plate 6 attached to a stationary base 5. The vibration plate 3 is vibrated in a direction of an arrow by the vibration of the vibration base 1. An amplitude and a vibrating frequency of the vibration base 1 are varied, a shearing distortion is applied to the vibration damping materials 4, 4 and a damping force and a restoration are checked. In FIG. 1, reference numeral 7 denotes a servo accelerometer attached to the vibration plate.

Results

Figure 3:
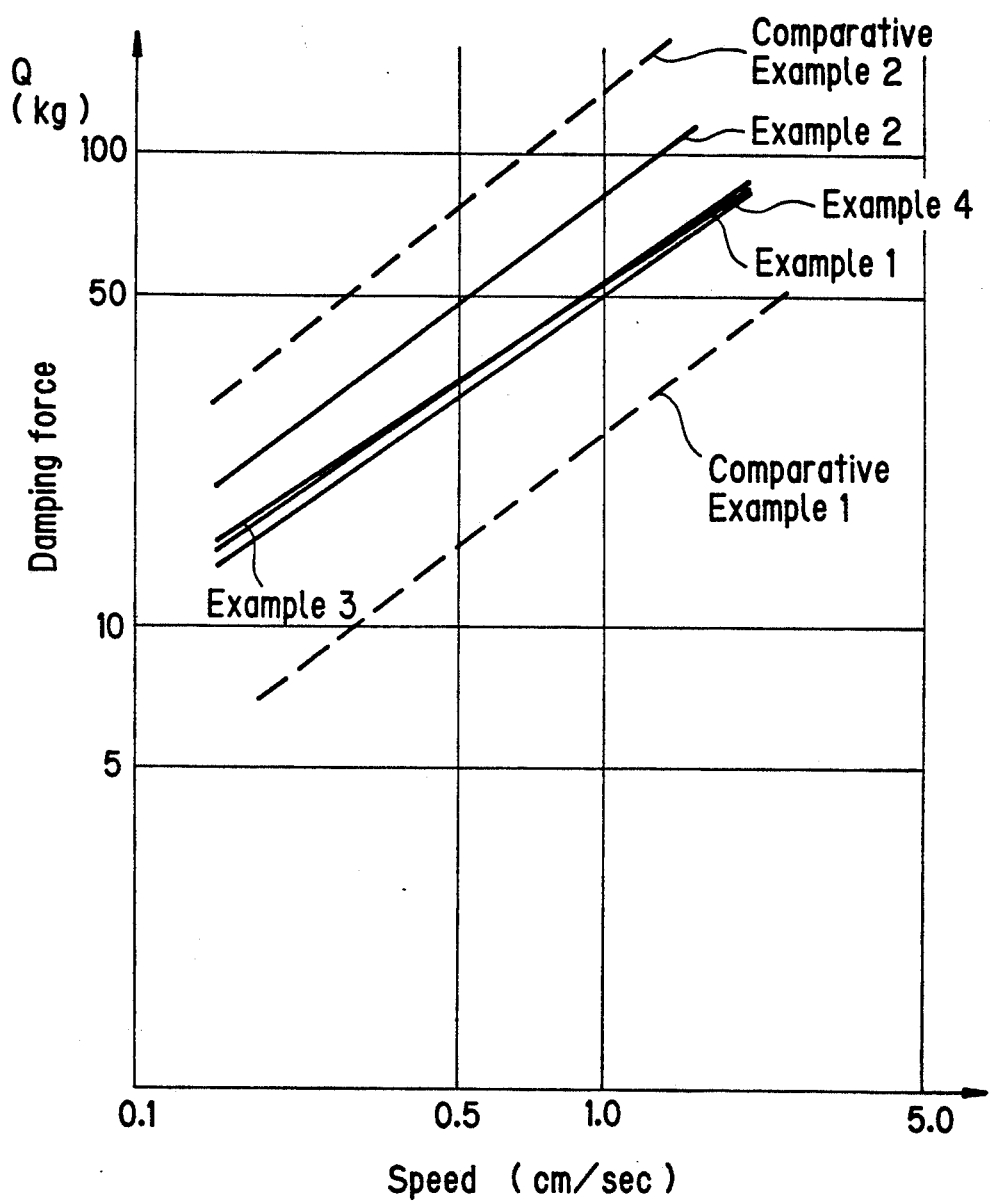
FIG. 3 is a graph showing an example of a relationship between a damping force and a speed of this invention and comparison examples.
Figure 4:
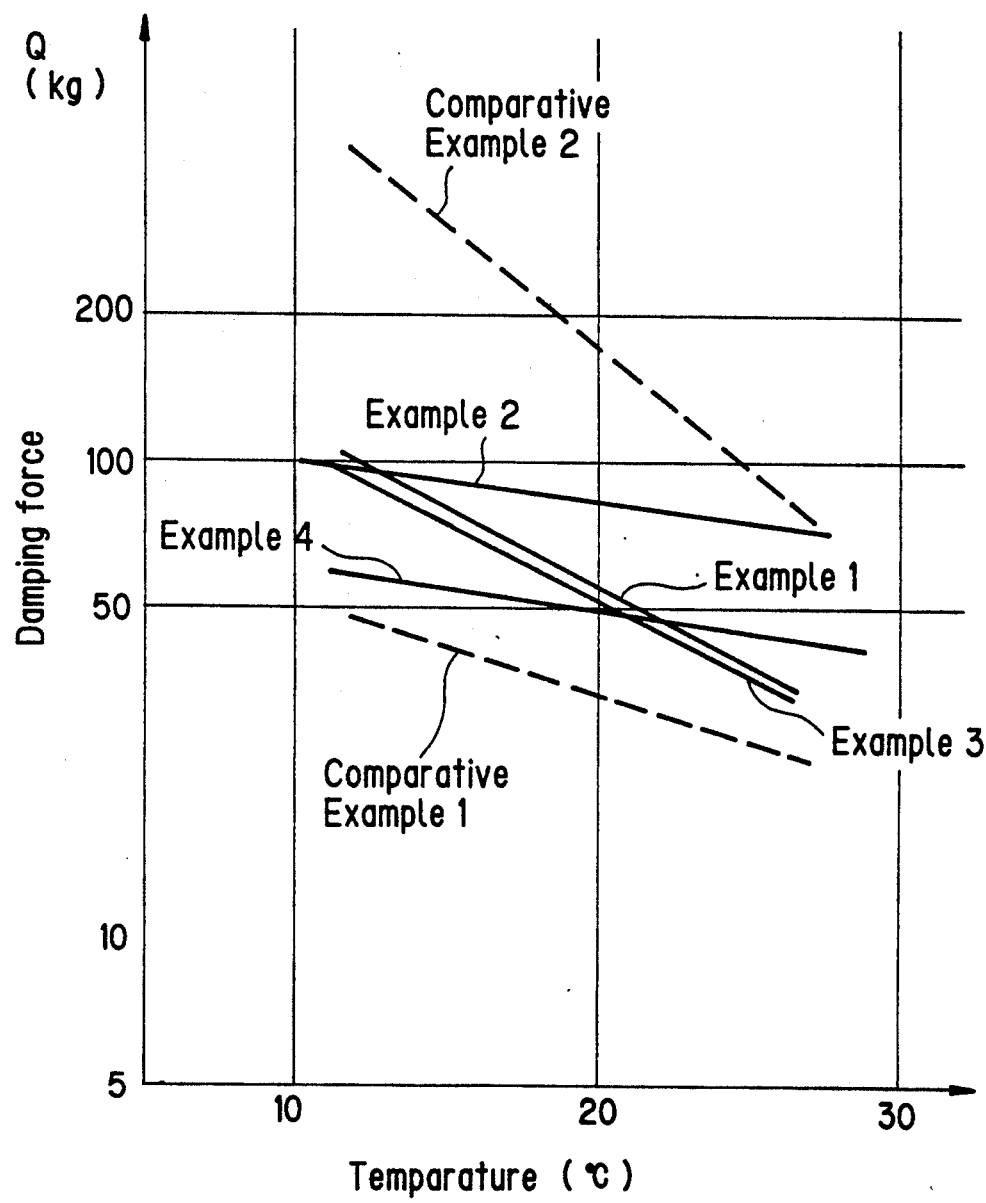
FIG. 4 is a graph showing an example of a relationship between a damping force and a temperature of this invention and comparison examples.

Table 1, FIGS. 3 and 4 show test results.

FIG. 3 shows a relationship between the damping force and a speed of the vibration plate 3. These values were obtained in the case of 0.33 Hz of vibrating frequency and 20° C. of temperature. The speed depends on a force applied to a vibration damping material when a shearing distortion due to vibration is applied to the vibration damping material. The speed was obtained by the following formula.

$$v = 2\pi f \cdot \delta$$

v: Speed (cm/sec.) f: Vibration frequency (cyc.)
δ: Amplitude (cm)

FIGS. 3 and 4 show damping forces at respective temperatures (10° to 30° C.) that a vibration damping material is generally used. These values were obtained in the case of 0.33 Hz of vibrating frequency and 5 mm of amplitude.

In Comparative Example 1, a material having high penetration (140 or more) was evaluated. In Comparative Example 2, a material having less quantity of thermoplastic rubber (10% or less) was evaluated.

The vibration damping materials of the Examples according to this invention had larger damping force Q than that of the Comparative Example 1, and thus the vibration damping effect of the material of the Examples is preferable. The material of the Comparative Example 2 had large damping force, but had large temperature dependency, and thus was not preferable in practical use.

The vibration damping materials of the Examples 1 and 2 had large damping force against a shearing distortion due to vibration, and less change with respect to the temperatures and was thus preferable as a vibration damping material.

The vibration damping material of the Example 3 did not include a tacky producer. As understood from FIGS. 3 and 4, the material of the Example 3 had substantially the same damping performance as that of the Example 1 as to the damping force and temperature dependency. The peeling strength of the material of the Example 3 was "0", which indicated wrong adhesion properties at low temperatures, but had no problem in case of using at ambient temperatures.

The vibration damping material of the Comparative Example 3 had low penetration (less than 35), high viscosity so that mixing was considerably difficult. The vibration damping material of the Comparative Example 4 included excess quantity of thermoplastic rubber (over 30%), and had high viscosity so that mixing was impossible.

The vibration damping material including 24 parts by weight of the tacky producer was produced. The material was too soft to measure the Pealing strength and damping force thereof.

According to this invention, the following advantages are provided.

The vibration damping material of this invention has stable vibration damping effect in a wide temperature range. Particularly, the vibration damping material has high damping effect against a shearing deformation.

Since the vibration damping material of this invention has both preferable viscoelasticity and preferable adhesive properties, the material is easily worked, and simply adhered to a building at a site, and hence easily executed.

The vibration damping material of this invention can be molded in a desired shape, for example, in a block or sheet shape in response to the using object, and handled conveniently.

The vibration damping material of this invention can be melted (at 180° to 200° C.) so as to be in a liquid state to feed the same into a desired place.

What is claimed is:

1. A vibration dampening material of asphalt cement consisting essentially of:
   a) 76 or more percent by weight of asphalt cement;
   b) one or more thermoplastic rubber selected from the group consisting of natural rubber, styrene-butadiene, butyl rubber, neoprene rubber and chloroprene rubber; and
   c) 1 to 20 percent by weight of tacky producer selected from the group consisting of polybutene, polybutenyl succinic anhydride, terpinic resin and modified wood resin; said dampening material having a penetration of from about 35 to about 140.

2. The vibration damping material according to claim 1, wherein a penetration of said asphalt falls in a range of 35 to 300.

3. The vibration damping material according to claim 1, wherein said thermoplastic rubber is styrene-butadiene-styrene block copolymer or styrene-isoprene-styrene block copolymer.

4. The vibration damping material according to claim 1, wherein said thermoplastic rubber is reclaimed rubber.

5. The vibration damping material according to claim 1, wherein said polybutene or polybutenyl succinic anhydride is liquid at ambient temperatures, or said terpinic resin or said denatured wood rosin is solid at ambient temperature.

6. A vibration damping material of asphalt cement consisting essentially of:
   a) 76 or more percent by weight of asphalt cement; and
   b) one ore more thermoplastic rubber selected from the group consisting of natural rubber, styrene-butadiene, butyl rubber, neoprene rubber, and chloroprene rubber;
   said damping material having a penetration of from about 35 to about 140.

7. A vibration damping material of asphalt cement consisting essentially of:
   a) 60–80 percent by weight of asphalt cement;
   b) 10–30 percent by weight of thermoplastic rubber selected from the group consisting of natural rubber, styrene-butadiene, butyl rubber, neoprene rubber, and chloroprene rubber; and
   c) 1–20 percent by weight of tacky producer;
   said damping material having a penetration of from about 35 to about 140.

8. A vibration damping material as in claim 1, comprising 86–90 percent by weight of asphalt cement.

9. A vibration damping material as in claim 6, comprising 86–90 percent by weight of asphalt cement.

10. A vibration damping material as in claim 7, comprising 68–75 percent by weight of asphalt cement.

11. A vibration damping material as in claim 3, wherein said tacky producer is one or more member selected from the group consisting of polybutene, polybutenyl succinic anhydride, terpinic resin and modified wood rosin.

* * * * *

UNITED STATES PATENT AND TRADEMARK OFFICE
CERTIFICATE OF CORRECTION

PATENT NO. : 5,324,758
DATED : June 28, 1994
INVENTOR(S) : Masaaki TAKAHASHI et al.

It is certified that error appears in the above-indentified patent and that said Letters Patent is hereby corrected as shown below:

On title page, item

[75] Inventors: Change the third inventor's name from "Kazuyoshi Iatagaki" to --Kazuyoshi Itagaki--.

[73] Assignees: Change the Assignees from "Sohwa Shell Sekiyu Kabushiki Kaisha; Shimizu Construction Co., Ltd." to --Showa Shell Sekiyu Kabushiki Kaisha; Shimizu Construction Co., Ltd.--.

Signed and Sealed this

Eighth Day of November, 1994

*Attest:*

BRUCE LEHMAN

*Attesting Officer*     *Commissioner of Patents and Trademarks*